Oct. 9, 1956  J. R. WADDELL  2,765,566
AUTOMATIC FISHING APPARATUS
Filed Nov. 27, 1953  2 Sheets-Sheet 1
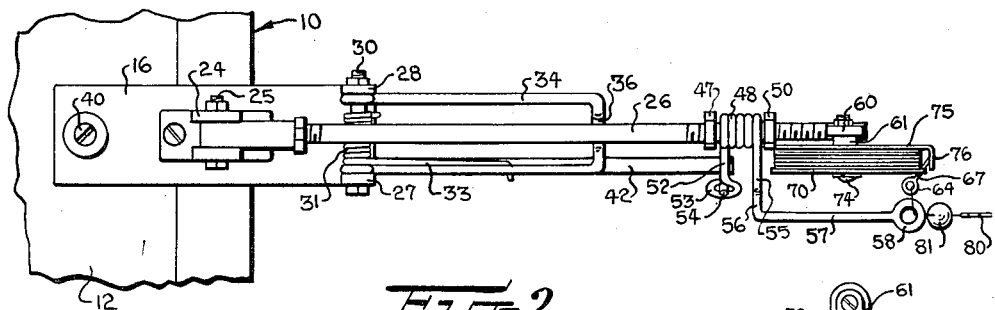
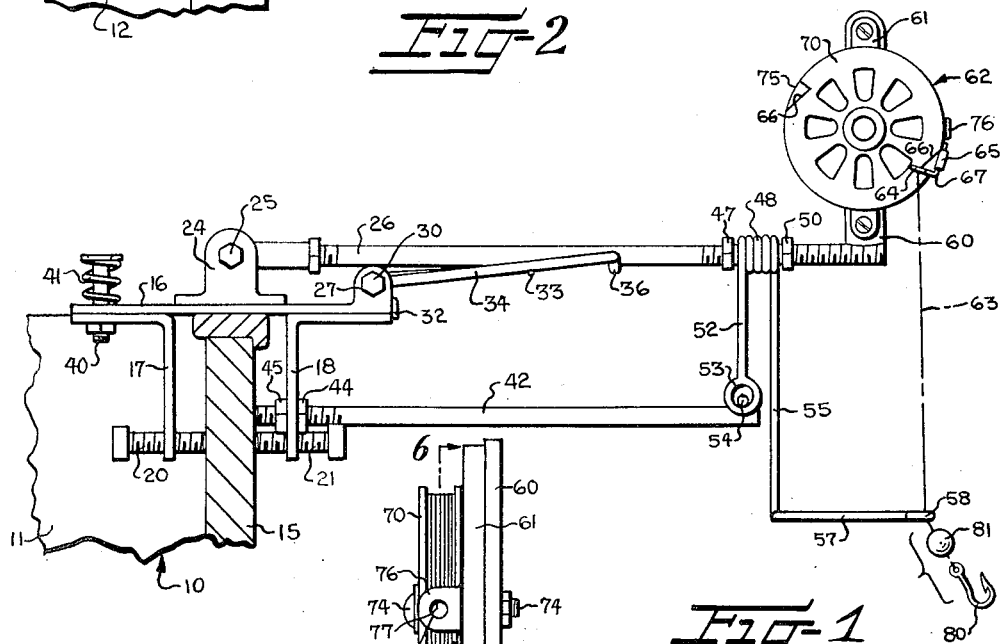
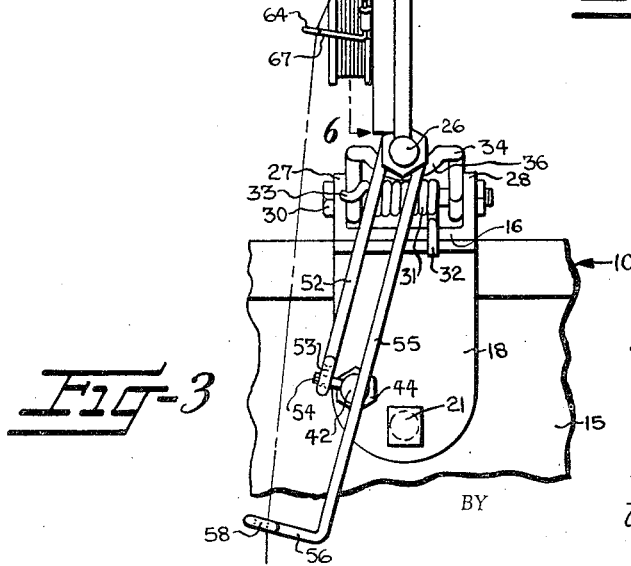
JAMES R. WADDELL,
INVENTOR.
BY Eaton & Bell
ATTORNEYS

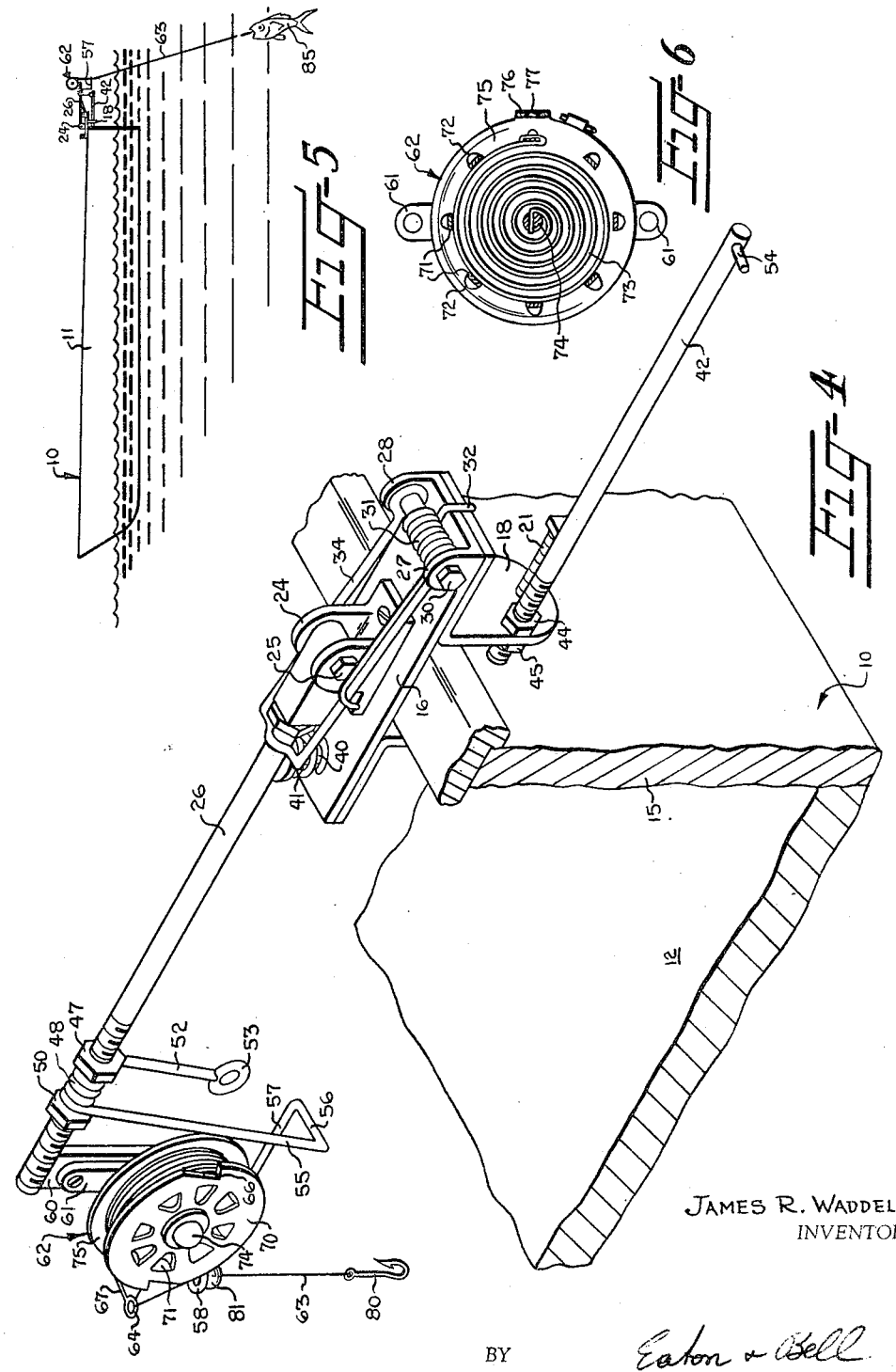

United States Patent Office 2,765,566
Patented Oct. 9, 1956

2,765,566

AUTOMATIC FISHING APPARATUS

James R. Waddell, Charlotte, N. C.; R. E. Waddell and J. B. Waddell, executors of said James R. Waddell, deceased, assignors to J. R. Waddell and Sons, Inc., Charlotte, N. C., a corporation of North Carolina Application November 27, 1953, Serial No. 394,643

4 Claims. (Cl. 43—16)

This invention relates to apparatus adapted to be attached to a suitable support such as a pier, or to the gunwale or rear end of a boat and which can be set and when a fish bites and is hooked it will automatically reel in the fish and upon complete reeling in of the fish, spring actuating mechanism will be tripped to land the fish in the boat or on any other structure to which the apparatus has been attached.

It is an object of this invention to provide a fishing apparatus comprising a pole member pivoted at one end and having a reel on its other end and having means for affixing the pivoted end of the pole member to the gunwale or stern board of a boat or to any other suitable support and said pole member being provided with a reel on its free end from which extends a fishing line with hook and sinker thereon and said pole member having disposed in parallel relation thereto and preferably below the pole member, a suitable elongated rod or support and the pole member has a retaining mechanism pivotally mounted thereon and provided with an eye or hook adapted to engage a pin on the rod member to hold the fishing pole in a set position extending outwardly from the boat or other support and said retaining member having associated therewith an eye member through which the fishing line extends so that when a fish is hooked the reel will be released by the tension on the line to wind up the line onto the reel and when the sinker or other object on the line engages the eye member associated with the retaining member, the retaining member will be released from its pin to allow spring means associated with the pole to pivot the pole and to impart thereto an approximately half revolution to land the fish in the boat or on the support to which the fishing apparatus is attached.

Some of the objects of the invention having been stated, other objects will appear as the description proceeds, when taken in connection with the accompanying drawings in which—

Figure 1 is a side elevation of the apparatus and showing a portion of a boat in section and showing the apparatus about ready to be tripped;

Figure 2 is a plan view of Figure 1;

Figure 3 is a view in elevation looking at the right-hand end of Figure 1;

Figure 4 is an isometric view showing the apparatus after it has been tripped and has landed the fish;

Figure 5 is a view on a reduced scale showing the apparatus associated with a boat;

Figure 6 is a vertical sectional view taken substantially along the line 6—6 in Figure 3.

Referring more specifically to the drawings, the numeral 10 indicates a boat to which the apparatus is shown attached and said boat having side portions 11, a bottom 12 and a stern board 15 to which the apparatus is shown attached though it could as well be attached to one of the side members 11, as desired.

The apparatus comprises a plate member 16 having right-angular members 17 and 18 having one of their legs secured to the plate 16 as by welding and these angle members 17, 18 are threadably penetrated by screws 20 and 21 which may be tightened or driven home on each side of the stern board 15 to hold the plate member 16 in a clamped position. The plate member 16 has a U-shaped bracket 24 suitably secured thereto which is penetrated by a bolt 25 on which is pivotally mounted one end of a rod or pole 26. The plate 16 also has upwardly projecting portions 27 and 28 on the outer end thereof which are penetrated by a bolt 30 which is surrounded by a torsion spring 31, one leg of which extends down over the end of the plate 16 as at 32, and the other leg 33 extends outwardly and is hooked under a U-shaped member 34 which has its free ends pivoted on the bolt 30 and the closed end of the U-shaped member 34 has a downwardly pressed portion 36 in which the rod or pole 26 is adapted to rest at all times under the influence of the torsion spring 31.

The left-hand end of plate 16 and bracket 17 in Figure 1 has slidably mounted therein a bolt 40 which is urged upwardly by a compression spring 41 and the head of this bolt 40 is adapted to be engaged by the pole 26 when the parts move to the position shown in Figure 4 to act as a shock absorber to arrest movement of the pole 26.

Disposed preferably below the pole 26 is an elongated rod or shaft 42 which is threaded at its left-hand end in Figure 1 and slidably penetrates the vertical leg of bracket 18 and also can be extended to fit against the stern board 15 and suitable nuts 44 and 45 are threaded thereon for anchoring the supporting rod 42 in the bracket 18. The free end of the pole member 26 is threaded and has first inserted thereon a nut 47 and then a coiled portion 48 of a rather rigid wire is inserted thereover and then nut 50 is threaded onto the free end of the rod to loosely confine the coil 48. The coil 48 has a downwardly projecting portion 52 provided with an eye 53 in its lower end which is adapted to fit over a pin 54 which projects laterally from the free end of the rod 42. The coil 48 has integral therewith a downwardly extending portion 55 which also extends laterally as at 56 and then outwardly to form portion 57 provided with an eye 58 in its free end.

Suitably secured to the free threaded end of rod 26, such as by welding, is a support 60 this being welded thereon after the coil 48 and the nuts 47 and 50 have been mounted thereon. The support 60 supports a bracket 61 which rotatably supports a reel 62 onto which is wound a line 63 and the line 63 passes through an eye 64 on a wire member 67 pivoted as at 65 to one side of the reel casing and one of the sides of the reel has notches 66 therein into which the member 67 having the eye 64 thereon may be inserted after the line 63 has been extended to fishing position or to the position shown in Figure 5 to hold the reel aaginst inward winding movement. The reel used is not a part of the invention and is substantially of the structure shown in the patent to White No. 2,577,555 of December 4, 1951. The reel proper is preferably formed from a side plate 70 having lateral projections 71 which are upturned at their free ends 72 and onto which the line 63 may be wound and this reel is normally biased to wind the line thereon by means of a torsion spring 73 fixed to a central shaft 74 at one end and having its other end secured to one of the transverse portions 71. The bracket 61 has integral therewith a housing disk 75, which has a laterally projecting portion 76 provided with a hole 77 through which the line 63 passes.

In the position shown in Figures 2 and 3, the apparatus is set ready to catch a fish and in Figure 5 a fish 85 is shown hooked and being wound in. In Figure 1 a hook 80 is shown in wound-up position and almost ready to trip the mechanism to release the reel. The line 63 preferably has a weight 81 thereon of greater diameter than the inside diameter of the eye 58 so that it cannot pass through the eye 58 and when the weight 58 under the influence of the winding up action of the reel engages the eye 58, the member 55 along with the eye 58 will be swung to the left or in a clockwise manner in Figure 3 which will move the eyelet or eye 53 from off the free end of pin 54 to allow the parts to move to the position shown in Figure 4, under the influence of coil 31. Previous to this, of course, when a fish becomes hung the pull of the fish will pull the member 67 from out of one of the notches 66 and will cause the reel to start winding up the line to the point where the weight 81 will engage eyelet 58 and trip the mechanism to allow the parts to assume the position shown in Figure 4.

In the drawings and specification there has been set forth a preferred embodiment of the invention and although specific terms are employed, they are used in a generic and descriptive sense only, and not for purposes of limitation, the scope of the invention being defined in the claims.

I claim:

1. Automatic fishing apparatus comprising a plate, means for securing the plate to a suitable support, a bracket secured to the plate and having a pair of upstanding lugs thereon, a pole having one end pivotally mounted between said lugs, and being swingable through an arc of approximately 180 degrees in a vertical plane, tension means tending to swing the pole to one end of the arc of travel, means for anchoring the pole at the other end of its arc of travel, a reel mounted on the free end of the pole and having a line thereon and having spring means for winding the line onto the reel, said reel having a notch in the periphery of one of its side walls, a pivoted detent member adapted to be swung into the notch when the line has been unwound from the reel, said detent member having an eyelet through which the line passes, the anchoring means comprising a member rotatably mounted on said pole and having a first arm for releasably anchoring said pole and a second arm fixed relative to the first arm and having an eyelet on its outer end through which the line is passed, said line near its outer end having an enlarged member thereon adapted to strike the eyelet in the second arm to partially rotate said member on said pole to release the first arm of the anchoring means for the pole to allow its tension means to swing the pole to the other end of its arc of travel.

2. Automatic fishing apparatus comprising a plate, means for securing the plate in a generally horizontal position to a suitable support, a first pair of projections on the upper surface of said plate, a pole having one end pivotally secured between said projections, and being swingable through an arc of approximately 180 degrees in a vertical plane, a second pair of projections on the upper surface of said plate, a U-shaped member pivotally mounted on said projections and having a portion thereof extending across the pole, spring means engageable with said U-shaped member tending to swing the pole to one end of the arc of travel, means for anchoring the pole at the other end of its arc of travel, a reel mounted on the free end of the pole and having a line thereon and having spring means for winding the line onto the reel, said reel having at least one notch in the periphery of one of its side walls, a detent member adapted to be swung into a notch when the line has been unwound from the reel to prevent rotation of said reel, said detent member having an eyelet positioned out of the normal path of travel of said line and through which the line passes whereby, upon a pull being exerted on said line, said detent will swing out of said notch, the pole anchoring means comprising a member rotatably mounted on said pole and having a first arm for releasably anchoring said pole and a second arm fixed relative to the first arm and having an eyelet on its outer end through which the line is passed, said line near its outer end having means thereon adapted to strike the eyelet in the second arm to partially rotate said member on said pole to release the first arm of the anchoring means for the pole to allow its tension means to swing the pole to the other end of its arc of travel, and shock absorbing means disposed on the upper surface of the plate and in the line of travel of the pole.

3. An automatic fishing apparatus comprising a plate, means for securing the plate to a fixed support, said means comprising depending spaced apart flanges on the plate adapted to extend over some portions of the fixed support, means on said flanges extending therethrough and engageable with the fixed support to support the plate, a horizontal rod having one end secured to one of the depending flanges and abutting against the fixed support and having a laterally extending pin near its other end, a pair of upwardly extending ears on the plate, a bolt extending through said ears, a fishing pole having one end pivotally mounted on said bolt, a second pair of upwardly extending ears having a bolt extending therethrough, a U-shaped member having its legs pivotally mounted on said last-named bolt and the outer end of the U-shaped member being engageable under the fishing pole, a torsion spring on said last-named bolt and urging said U-shaped member against the pole, the spring being under tension when in this position, a coil member mounted near the outer end of the pole with means on the pole to prevent axial movement of the coil along the pole, said coil member having one downwardly extending portion having an eye on its end adapted to engage over the pin on the horizontal rod and another downwardly extending portion having a horizontally extending end portion and having an eye on its outer end, a reel mounted on the end of the fishing pole and a fishing line adapted to be wound and unwound on said reel, a hook and sinker on said line, said line passing through the last-named eye, the reel having means therein to wind up the line when a predetermined pull has been exerted on the line, the said sinker stopping the winding when brought into engagement with the eye, and when a fish is on the line adaptable to swing the end of the coil member laterally, the lateral movement of the end of the coil member causing the eye on the first-named extending portion of the coil member to disengage from the pin and release the pole, said torsion spring by engagement with the U-shaped member under the pole causing the pole to swing in a vertical plane and position the reel at the other side of the pole support.

4. The invention as claimed in claim 3 in which a resilient stop member is positioned on the plate for engagement by the pole.

References Cited in the file of this patent

UNITED STATES PATENTS

| | | |
|---|---|---|
| 2,194,088 | Joabson | Mar. 19, 1940 |
| 2,551,996 | Cherubini | May 8, 1951 |
| 2,577,554 | White | Dec. 4, 1951 |